USOO5606422A

United States Patent [19]
Yanagihara et al.

[11] Patent Number: 5,606,422
[45] Date of Patent: Feb. 25, 1997

[54] METHOD AND APPARATUS FOR RECORDING VIDEO SIGNALS ON A RECORD MEDIUM

[75] Inventors: Naofumi Yanagihara, Tokyo; Keiji Kanoto; Yukio Kubota, both of Kanagawa, all of Japan

[73] Assignee: Sony Corporation, Tokyo, Japan

[21] Appl. No.: 441,995

[22] Filed: May 16, 1995

Related U.S. Application Data

[62] Division of Ser. No. 283,652, Aug. 1, 1994, which is a continuation of Ser. No. 966,888, Oct. 27, 1992, abandoned.

[30]     Foreign Application Priority Data

May 11, 1991  [JP]  Japan ................................. 3-317497
Jun. 30, 1992  [JP]  Japan ................................. 4-196219

[51] Int. Cl.$^6$ ............................... H04N 9/79; G11B 5/00
[52] U.S. Cl. ................................................. 386/1; 360/32
[58] Field of Search ................................. 358/335, 310, 358/342; 348/384, 390, 393, 398, 403, 395; 360/32, 33.1

[56]              References Cited

U.S. PATENT DOCUMENTS

| | | |
|---|---|---|
| 4,638,380 | 1/1987 | Wilkinson et al. . |
| 4,764,820 | 8/1988 | Takeshita . |
| 5,068,744 | 11/1991 | Ito . |
| 5,161,031 | 11/1992 | Kimura et al. . |
| 5,175,631 | 12/1992 | Juri et al. ................................. 358/335 |
| 5,237,424 | 8/1993 | Nishino et al. .......................... 358/310 |
| 5,450,209 | 9/1995 | Niimura et al. ......................... 358/335 |

FOREIGN PATENT DOCUMENTS

| | | |
|---|---|---|
| 0469860 | 2/1992 | European Pat. Off. . |
| 0476630 | 3/1992 | European Pat. Off. . |
| 0500307 | 8/1992 | European Pat. Off. . |
| 3432420 | 5/1986 | Germany . |
| 2094591 | 9/1982 | United Kingdom . |
| WOA9102430 | 2/1991 | WIPO . |

OTHER PUBLICATIONS

IEEE Transactions on Consumer Electronics vol. CE-37, No. 3, Aug. 1991, New York US pp. 261–266, XP000263194 Yamamitsu et al. 'A Study on Trick Plays for Digital VCR' p. 262, right column, par. 2–p. 263, right column, Par. 1, p. 265, left column, line 1 –line 12 figures 4–5.

(List continued on next page.)

*Primary Examiner*—Thai Q. Tran
*Assistant Examiner*—Robert Chevalier
*Attorney, Agent, or Firm*—William S. Frommer; Alvin Sinderbrand

[57]              ABSTRACT

Methods and apparatus are provided for recording video signals in a plurality of tracks on a recording medium. In certain embodiments, first and second video signal intervals include respective first and second common sub-area signals representing at least one common sub-area of a video screen. The common sub-area signals of the first and second video signal intervals are recorded at respectively different locations within the plurality of tracks. In certain embodiments, component color video signals including luminance signals and first and second color difference signals are divided into a plurality of discrete cosine transformation (DCT) blocks and blocks representing common respective subdivisions of a video screen are assembled into corresponding macro blocks. Adjacent macro blocks are assembled into super macro blocks which, in turn, are arranged in a shuffled sequence relative to the positions of their subdivisions on the video screen for recording in the shuffled sequence. In certain embodiments, digital video signals representing a video screen are recorded in a plurality of tracks on a recording medium after dividing the digital video signals into a plurality of macro blocks assembled into sub-area groups of the video screen. The sub-area groups are shuffled by forming a sequence of track units each including a plurality of the sub-area groups one each from a respective horizontal division of the video screen. Each track unit is recorded in a respective one of a plurality tracks on the recording medium.

18 Claims, 17 Drawing Sheets

OTHER PUBLICATIONS

Signal Processing. Image Communication vol. 2, No. 2, Aug. 1990, Amsterdam NL pp. 155–169, XP000243475 Pereira et al. 'A CCITT Compatible Coding Algorithm for Digital Recording of Moving Images' p. 156, right column, par. 2–par. 5.

SMPTE Journal vol. 95, No. 10, Oct. 1986, Scarsdale, NY US pp. 1009–1016 Brush 'Video Data Shuffling for the 4:2:2 DVTR'.

( 1 BLOCK )

| | | | | | | | |
|---|---|---|---|---|---|---|---|
| 139. | 144. | 149. | 153. | 155. | 155. | 155. | 155. |
| 144. | 151. | 153. | 156. | 159. | 156. | 156. | 156. |
| 150. | 155. | 160. | 163. | 158. | 156. | 156. | 156. |
| 159. | 161. | 162. | 160. | 160. | 159. | 159. | 159. |
| 159. | 160. | 161. | 162. | 162. | 155. | 155. | 155. |
| 161. | 161. | 161. | 161. | 160. | 157. | 157. | 157. |
| 162. | 162. | 161. | 163. | 162. | 157. | 157. | 157. |
| 162. | 162. | 161. | 161. | 163. | 158. | 158. | 158. |

| | | | | | | | |
|---|---|---|---|---|---|---|---|
| 314.91 | -0.26 | -3.02 | -1.30 | 0.53 | -0.42 | -0.68 | 0.33 |
| -5.65 | -4.37 | -1.56 | -0.79 | -0.71 | -0.02 | 0.11 | -0.30 |
| -2.74 | -2.32 | -0.39 | 0.38 | 0.05 | -0.24 | -0.14 | -0.02 |
| -1.77 | -0.48 | 0.06 | 0.36 | 0.22 | -0.02 | -0.01 | 0.08 |
| -0.16 | -0.21 | 0.37 | 0.39 | -0.03 | -0.17 | 0.15 | 0.32 |
| 0.44 | -0.05 | 0.41 | -0.09 | -0.19 | 0.37 | 0.26 | -0.25 |
| -0.32 | -0.09 | -0.08 | -0.37 | -0.12 | 0.43 | 0.27 | -0.19 |
| -0.65 | 0.39 | -0.94 | -0.46 | 0.47 | 0.30 | -0.14 | -0.11 |

Fig. 11

| AREA<br>Q No. | 0 | 1 | 2 | 3 | 4 | 5 | 6 | ... | 11 | 12 | 13 | 14 | 15 |
|---|---|---|---|---|---|---|---|---|---|---|---|---|---|
| 0 | 2 | 2 | 2 | 4 | 4 | 4 | 6 | | 10 | 16 | 16 | 16 | 16 |
| 1 | 2 | 2 | 2 | 4 | 4 | 4 | 6 | | 10 | 16 | 16 | 16 | 32 |
| 2 | 2 | 2 | 2 | 4 | 6 | 6 | 6 | | 10 | 16 | 16 | 16 | 32 |
| 3 | 2 | 4 | 4 | 4 | 6 | 6 | 8 | | 10 | 16 | 16 | 16 | 32 |
| 4 | 4 | 4 | 4 | 4 | 6 | 6 | 8 | | 10 | 16 | 16 | 16 | 32 |
| ⋮ | | | | | | | | | | | | | |
| 29 | 12 | 14 | 14 | 16 | 20 | 20 | 24 | | 48 | 48 | 48 | 64 | 64 |
| 30 | 12 | 14 | 14 | 16 | 24 | 24 | 24 | | 48 | 64 | 64 | 64 | 64 |
| 31 | 14 | 16 | 16 | 16 | 24 | 24 | 32 | | 48 | 64 | 64 | 64 | 64 |

Fig. 12

HORIZONTAL →

VERTICAL ↓

| 0 | 2 | 6 | 12 |
|---|---|---|---|
| 1 | 7 | 10 | 13 |
| 4 | 9 | 11 | 14 |
| 3 | 5 | 8 | 15 |

Fig. 13

| 265 | -113 | 20 | 12 | -11 | 4 | 2 | 1 |
|-----|------|-----|----|-----|---|---|----|
| -29 | 38 | -28 | 16 | -7 | 2 | 2 | -1 |
| 39 | -40 | 15 | 4 | -9 | 4 | 0 | 0 |
| 11 | -10 | -2 | 9 | -6 | 2 | 2 | -1 |
| 0 | 2 | -3 | 2 | -3 | 1 | 0 | 1 |
| 9 | -12 | 4 | 3 | -4 | 2 | 0 | -1 |
| 1 | 1 | -1 | 0 | 0 | 0 | 1 | -1 |
| 1 | -2 | 0 | 2 | -2 | 2 | 0 | 0 |

Fig. 14

| area: | 0 | 1 | 2 | 3 | | 12 | 13 | 14 | 15 |
|-------|---|---|---|---|---|----|----|----|----|
| Q No.9 | 6 | 8 | 8 | 8 | 8 | 20 | 20 | 20 | 64 |

Fig. 15

|   | 0 | 1 | 2 | 3 | ④ | 5 | 6 | 7 |
|---|---|---|---|---|---|---|---|---|
| 0 | 265 | -19 | 3 | 2 | -1 | 0 | 0 | 0 |
| 1 | -5 | 6 | -4 | 2 | -1 | 0 | 0 | 0 |
| 2 | 5 | -5 | 2 | 1 | -1 | 0 | 0 | 0 |
| 3 | 1 | -1 | 0 | 1 | -1 | 0 | 0 | 0 |
| 4 | 0 | 0 | 0 | 0 | 0 | 0 | 0 | 0 |
| ⑤ | 1 | -2 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |

Fig. 16

| AC COEFFICIENTS | CODE | BIT LENGTH |
|---|---|---|
| 0 | 0 | 1 |
| ±1 | 10× | 3 |
| ±2, ±3 | 110×× | 5 |
| ±4 ~ ±7 | 1110××× | 7 |
| ±8 ~ ±15 | 11110×××× | 9 |
| ⋮ | ⋮ | ⋮ |

Fig. 17

| 9 | 11 | 5 | 5 | 3 |   |   |   |
|---|---|---|---|---|---|---|---|
| 7 | 7 | 7 | 5 | 3 |   |   |   |
| 7 | 7 | 5 | 3 | 3 |   |   |   |
| 3 | 3 | 1 | 3 | 3 |   |   |   |
| 1 | 1 | 1 | 1 | 1 |   |   |   |
| 3 | 5 | 1 | 1 | 1 |   |   |   |
|   |   |   |   |   |   |   |   |
|   |   |   |   |   |   |   |   |

METHOD AND APPARATUS FOR RECORDING VIDEO SIGNALS ON A RECORD MEDIUM

This application is a division of application Ser. No. 08/283,652, filed Aug. 1, 1994, which is a continuation of Ser. No. 07/966,888 filed Oct. 27, 1992, now abandoned.

BACKGROUND OF THE INVENTION

The present invention relates to methods and apparatus for processing video signals for recording, including methods and apparatus for encoding digital video signals by means of discrete cosine transformation (DCT) for recording by a digital VTR.

Digital VTR's serve both to digitize a video signal and record the digitized signal on magnetic tape. The bandwidth of a digital video signal as sampled exceeds the practical recording capacity of the magnetic tape. Accordingly, it is impractical to record the digital video signal as sampled, so that the signal is first encoded by a highly efficient encoding process prior to recording.

It has been proposed to employ discrete cosine transformation in carrying out such a highly efficient encoding process for digital video signals to be recorded by a digital VTR. In the discrete cosine transformation process, the digital video data are first arranged in predetermined blocks. For example, such blocks can be composed of eight-by-eight picture elements or pixels in the time domain. The predetermined digital video blocks are transformed into frequency domain data by means of the discrete cosine transformation process.

The video signals possess correlation, so that upon transformation into the frequency domain, the resulting DC components are predominant. Moreover, the frequency components produced by discrete cosine transformation typically have their greatest power levels at the lowest frequencies and, as the frequencies of the components increase, the power levels of the components generally decrease.

Once the discrete cosine transformation process has been carried out, the frequency domain data is then encoded in a variable length code format, such as Huffman codes or the like. This serves to decrease the number of bits required to represent the transformed data. Where the data is to be recorded on magnetic tape, an error correction coding process using Reed Solomon codes typically is also carried out.

Since the frequency domain data is encoded in a variable-length format, the amount of data representing each video screen will vary from screen to screen. If the data is recorded in such variable amounts, the data representing each screen will not be coextensive with the recording tracks, so that editing of the recorded signals becomes difficult. In order to align the data of each screen with respective ones of the recording tracks, the quantization intervals employed in quantizing the variable-length encoded data are adjusted so that the amount of data representing each screen is maintained substantially constant.

Certain data patterns (such as a sky background, for example) change very little so that the values of the frequency coefficient data produced upon discrete cosine transformation of such patterns are quite small. Accordingly, when such data is variable-length encoded, a relatively small number of bits are produced and a relatively small quantization interval, therefore, will be selected for quantizing such data. However, in the case of data patterns having relatively large variations therein, the values of the frequency component data produced by discrete cosine transformation are relatively large. Consequently, a coarse quantization interval is selected for quantizing such data.

To prevent substantial variations in the quantization intervals among the various types of data, it has been proposed that a shuffling operation should be carried out so that the time sequence of the coefficient data for a given screen will not correlate with the spacial positions thereof. This conventional shuffling process employs a random selection of the data representing each screen.

However, the usefulness of data interpolation to counteract errors caused by head clogging or tape scratches was not foreseen when the conventional shuffling process was devised. Should one head of a digital VTR become clogged, the signals within a corresponding channel which would otherwise be reproduced thereby cannot be obtained. The presence of dirt or scratches on a tape guide can cause successive errors to occur in the longitudinal direction of a tape which passes over the guide. Since the data is shuffled randomly in the conventional process, the occurrence of such errors renders it the difficult to carry out interpolation to reconstruct the data which has been lost due to the error. A further disadvantage of random shuffling is the consequent difficulty in viewing reproduced screens in the course of a cue or review operation.

OBJECTS AND SUMMARY OF THE INVENTION

Accordingly, it is an object of the present invention to provide methods and apparatus for processing video signals for recording which substantially alleviate or overcome the above-mentioned disadvantages and problems associated with the prior art.

Another object of the present invention is to provide methods and apparatus for processing a video signal for recording which include shuffling of the video signals as recorded in such a manner that interpolation of the video signals upon reproduction is facilitated to permit recovery of data lost as a consequence of head clogging or scratches in the recording medium.

A further object of the present invention is to provide methods and apparatus for processing a video signal for recording which facilitate viewing of the reproduced signal in the course of a cue or review operation.

In accordance with one aspect of the present invention, a method and apparatus for recording video signals of first and second video signal intervals in a plurality of sequentially arranged tracks on a recording medium are provided. At least a portion of each of the first and second video signal intervals represents at least one common sub-area of a video screen. The method and apparatus comprise the steps of and the means for, respectively: dividing the video signals of each of the first and second video signal intervals into a plurality of respective sub-area signals each representing at least one respective sub-area of the video screen, the plurality of respective sub-area signals corresponding with the first and second video signal intervals including respective first and second common sub-area signals representing the at least one common sub-area; recording the plurality of respective sub-area signals of the first interval in a first group of the plurality of sequentially arranged tracks such that the plurality of respective sub-area signals of the first interval are recorded in a first predetermined pattern in the first group of tracks; and, recording the plurality of respective sub-area signals of the second interval in a second group of the plurality of sequentially arranged tracks such that the plurality of respective sub-area signals of the second interval are recorded in a second predetermined pattern in the second group of tracks; the first and second predetermined patterns being selected such that the first and second common sub-area signals are recorded at respective first and second locations within the first and second groups of tracks each corresponding with a position within the other of the first and second groups of tracks differing from the second and first locations therein, respectively.

Since the locations at which the first and second common sub-areas signals are recorded within their respective first and second groups of tracks do not correspond, it is possible to arrange the recording locations of the first and second common sub-area signals so that they are reproduced by respectively different recording heads. Moreover, by selecting the recording locations of the first and second common sub-area signals at respectively different track locations, it is possible to avoid the loss of both such signals in the event of a longitudinal scratch in the recording medium, such as a video tape. Accordingly, it is possible by means of the present invention to ensure that at least one of the first and second common sub-area signals will be reproduced despite the clogging of a single recording head or the presence of a longitudinal scratch in the recording medium, so that the signals which have been lost during reproduction as a consequence can be reconstructed through interpolation of the reproduced signals.

In accordance with another aspect of the present invention, a method and apparatus for recording component color video signals representing at least a portion of a video screen in a plurality of tracks on a recording medium are provided. The component color signals include a luminance signal and first and second color difference signals. The method and apparatus comprise the steps of and the means for, respectively: dividing the luminance signal and first and second color difference signals into a plurality of DCT blocks each representing a respective subdivision of the video screen and selected to permit discrete cosine transformation thereof; collecting the DCT blocks of each of the luminance signal and first and second color difference signals into respective macro blocks including signals representing at least one common respective subdivision of the video screen; assembling super macro blocks each including a plurality of macro blocks representing adjacent sub-areas of the video screen; arranging the super macro blocks in a sequence shuffled relative to the positions of the subdivisions of the video screen represented thereby; carrying out a discrete cosine transformation of each of the DCT blocks; and recording the transformed DCT blocks assembled in the super macro blocks such that the super macro blocks are arranged in the shuffled sequence in the plurality of tracks on the recording medium. By assembling the macro blocks into super macro blocks which include adjacent ones of the macro blocks, it is substantially easier for a user to view the reproduced signal in the course of a cue or review operation.

In accordance with a further aspect of the present invention, a method and apparatus for recording digital video signals representing a video screen in a plurality of tracks on a recording medium, comprises the steps of and the means for, respectively: dividing the digital video signals into a plurality of blocks representing corresponding pixel arrays of said video screen; collecting the plurality of blocks of the divided digital video signals into respective macro blocks including digital video signals of a plurality of adjacent blocks; assembling the macro blocks into sub-area groups representing respective sub-areas of the video screen, the sub-areas being defined as divided portions of the video screen obtained by dividing the video screen by a first integer number along a horizontal direction thereof to form an integer number of horizontal divisions thereof and dividing the video screen by a second integer number along a vertical direction thereof to form a plurality of vertical divisions, the second integer number being equal to the number of the plurality of tracks; shuffling the sub-area groups by forming a sequence of track units each comprising a plurality of the sub-area groups including one sub-area group from each of the horizontal divisions of the video screen selected from a respectively different vertical division thereof; and recording the sequence of track units on the recording medium such that each track unit is recorded in a respective one of the plurality of tracks. By thus shuffling the sub-area groups so that the locations of the sub-areas represented thereby are dispersed within the video screen, it is relatively much easier for a user to determine the contents of the reproduced signal while carrying out a cue or review operation. In certain advantageous embodiments of the present invention, the vertical distance on the video screen between sub-areas represented by the sub-area groups is maximized in order to achieve an optimal dispersal of the sub-areas represented by the various groups within each track unit.

The above, and other objects, features and advantageous of the present invention, will be apparent in the detailed description of certain advantageous embodiments thereof which is to be read in connection with the accompanying drawings forming a part hereof, and wherein corresponding parts and components are identified by the same reference numerals in the several views of the drawings.

BRIEF DESCRIPTION OF THE DRAWINGS

FIG. 11 is a table illustrating plural sets of quantization intervals to be used selectively by a quantizer of the FIG. 1 embodiment;

FIG. 12 illustrates a manner in which a set of quantization intervals, selected from the table of FIG. 11, is employed by the quantizer of FIG. 1 for quantizing a discrete cosine transformed data block;

FIG. 13 illustrates a block of discrete cosine transformed data to be quantized by the quantizer of FIG. 1;

FIG. 14 illustrates a selected set of quantization intervals for use in quantizing the block of FIG. 13;

FIG. 15 illustrates a block of data resulting from the quantization of the discrete cosine transformed data of FIG. 13 with the use of the set of quantization intervals illustrated in FIG. 14;

FIG. 16 is an exemplary Huffman table used in estimating an amount of data resulting from variable length encoding for determining whether a predetermined data transfer rate of the digital VTR of FIG. 1 will be exceeded;

FIG. 17 illustrates numbers of bits assigned to corresponding ones of the quantized data of FIG. 15 as a result of variable-length encoding with the use of the Huffman codes of FIG. 16;

DETAILED DESCRIPTION OF CERTAIN ADVANTAGEOUS EMBODIMENTS

Figure 1:
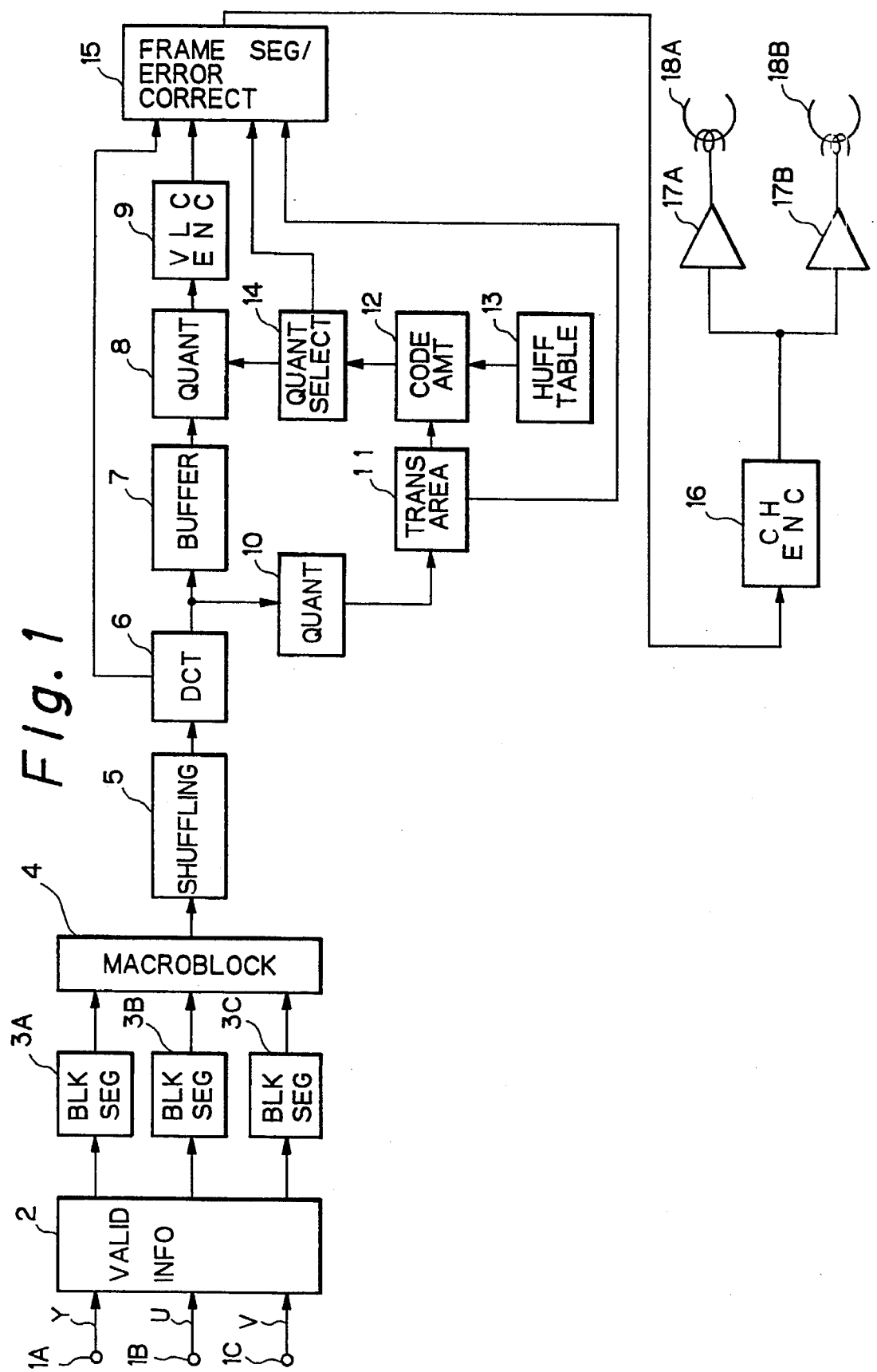
FIG. 1 is a block diagram of the recording system of a digital VTR in accordance with an embodiment of the present invention.

Referring to the drawings in detail, and presently to FIG. 1 thereof, the recording system of a digital VTR in accordance with a first advantageous embodiment of the present invention is illustrated therein. The recording system of FIG. 1 is provided with input terminals 1A, 1B and 1C to receive, respectively, a digital luminance signal Y and digital color difference signals U and V which conform, for example, to the NTSC system. The digital luminance signal Y and digital color difference signals U and V are (4:2:2) component signals so that the digital luminance signal Y has a sampling frequency of 13.5 MHz, the color difference signals U and V each have a sampling frequency of 6.75 MHz, and the data is quantized with eight bits per sample.

Figure 2:
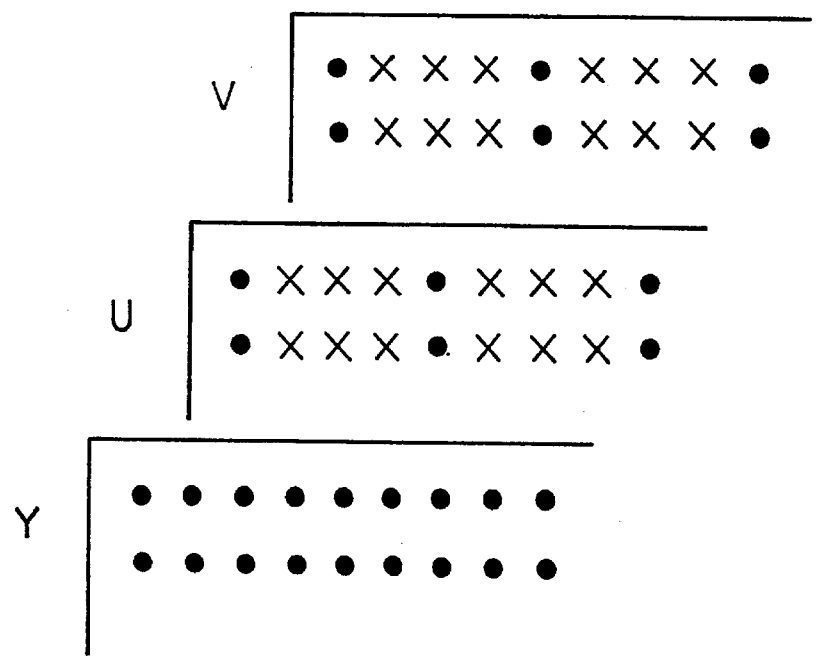
FIG. 2 is a diagram illustrating the removal of redundant components from input color difference signals as carried out by a valid information extracting circuit of the embodiment of FIG. 1.

The digital luminance signal Y and the color difference signals U and V received at the input terminals 1A–1C are supplied thereby to a valid information extracting circuit 2 which serves to remove as much redundant data within the input video signals as possible in order to supply only those portions of the input video signals which are necessary to preserve the information conveyed thereby. The amount of information contained in the color difference signals U and V is smaller than that contained in the luminance signal Y so that the amount of data within the color difference signals can be reduced further. In the embodiment of FIG. 1, the valid information extracting circuit 2 eliminates one half of the samples contained in the color difference signals U and V so that, as illustrated in FIG. 2, the number of samples included in the color difference signals U and V (wherein each remaining sample is represented by a solid dot) are only one quarter the number of samples included in the luminance signal Y.

Figure 3:
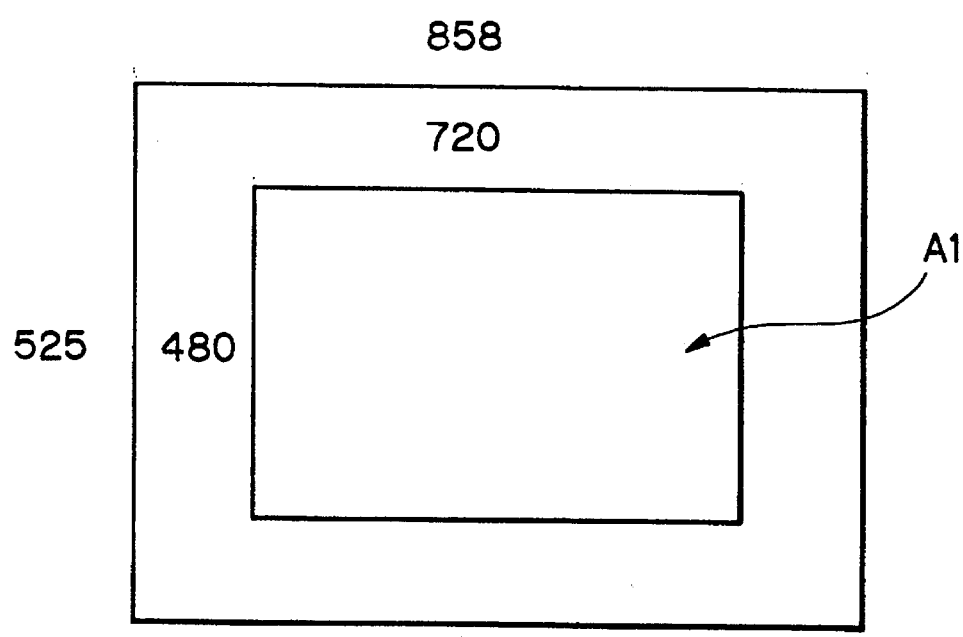
FIG. 3 illustrates the removal of both horizontal and vertical synchronizing and blanking interval signals by the valid information extracting circuit of FIG. 1 for data reduction.

A further reduction is achieved by the valid information extracting circuit 2 through the removal of the horizontal and vertical synchronizing and blanking interval signals. Consequently, the size of each frame of an NTSC video signal may be reduced from 525 lines by 858 samples to 480 lines by 720 samples, the size of an extracted valid screen A1 as illustrated in FIG. 3. It will be seen, therefore, that the valid information extracting circuit 2 serves to reduce the transmission rate of the input video signal substantially. For example, if the transmission rate of the input video signal is 16 MBPS, the circuit 2 can decrease the transmission rate to approximately 124 MBPS.

Figure 4:
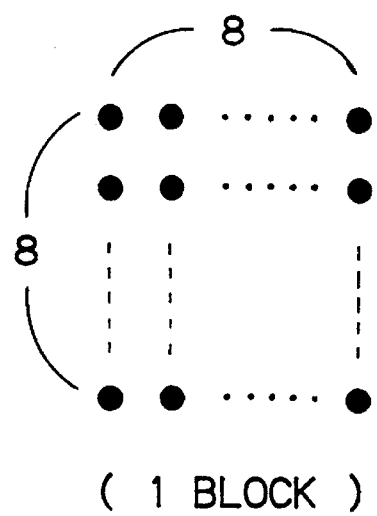
FIG. 4 illustrates an eight-by-eight block of pixels on which a discrete cosine transformation process is to be carried out by the FIG. 1 embodiment.

With reference again to FIG. 1, the luminance signal Y and color difference signals U and V output by the valid information extracting circuit 2 are supplied to block segmentation circuits 3A, 3B and 3C, respectively. The block segmentation circuits 3A, 3B and 3C form their respective signals Y, U and V into DCT blocks so that each may subsequently be transformed into frequency domain information by a discrete cosine transformation process, described in greater detail hereinbelow. Each DCT block thus formed includes (8×8) pixels, as illustrated in FIG. 4. As noted hereinabove, each pixel includes 8 bits.

The block segmentation circuits 3A–3C provide their respective outputs to a macro-block composing circuit 4. The circuit 4 arranges the luminance signal Y and the color difference signals U and V in block format into respective macro blocks each including signals representing a corresponding area of a given video frame. The macro-block format facilitates shuffling by the recording system and interpolation of the signals upon reproduction, both as described in greater detail hereinbelow.

Figure 5:
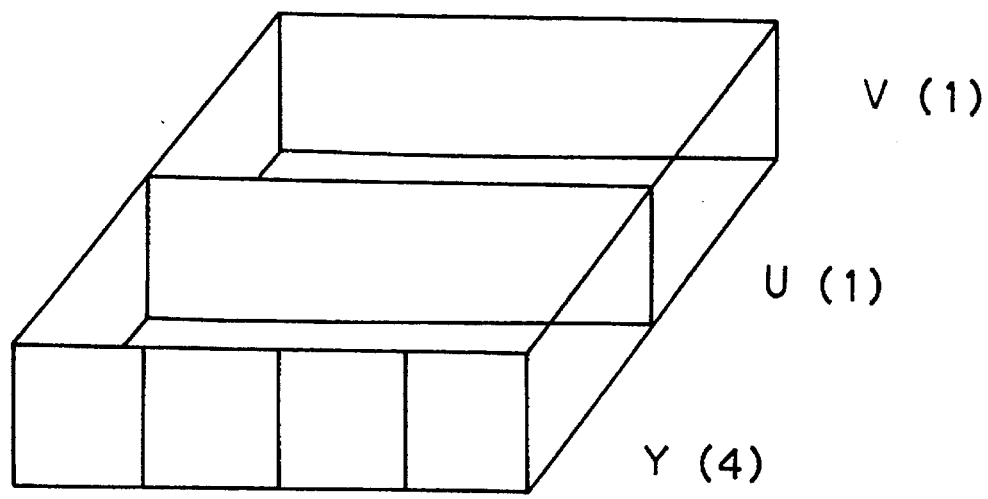
FIG. 5 illustrates the composition of a macro-block including both luminance and color difference signals formed by a macro-block composing circuit of FIG. 1.

Since the digital luminance signal Y and the color difference signals U and V are supplied to the recording system in a (4:2:2) format at the inputs 1A–1C and the circuit 2 reduces the number of samples of the color difference signals by half, as supplied to the macro-block composing circuit 4, there are four times as many luminance pixels as color difference pixels U or V for a given area of the video frame. The macro-block composing circuit 4, therefore, includes four blocks of pixel data for the luminance signal and one block each of the pixel data for the color difference signals U and V in each macro block representing a corresponding area of the video frame as illustrated in FIG. 5.

Referring again to FIG. 1, the macro-block composing circuit 4 supplies the luminance and color difference data in macro-block format to a shuffling circuit 5. As noted above, each of the macro blocks represents luminance and color difference signals of a predetermined area in a given video frame. The shuffling circuit 5 assembles the received macro blocks into groups each including three adjacent macro blocks and referred to herein as super macro blocks. It will be seen that by assembling the shuffled video signals in super macro block units, the shuffled units are relatively large, thus facilitating viewing of the reproduced signal in the course of a cue or review operation.

Figure 6:
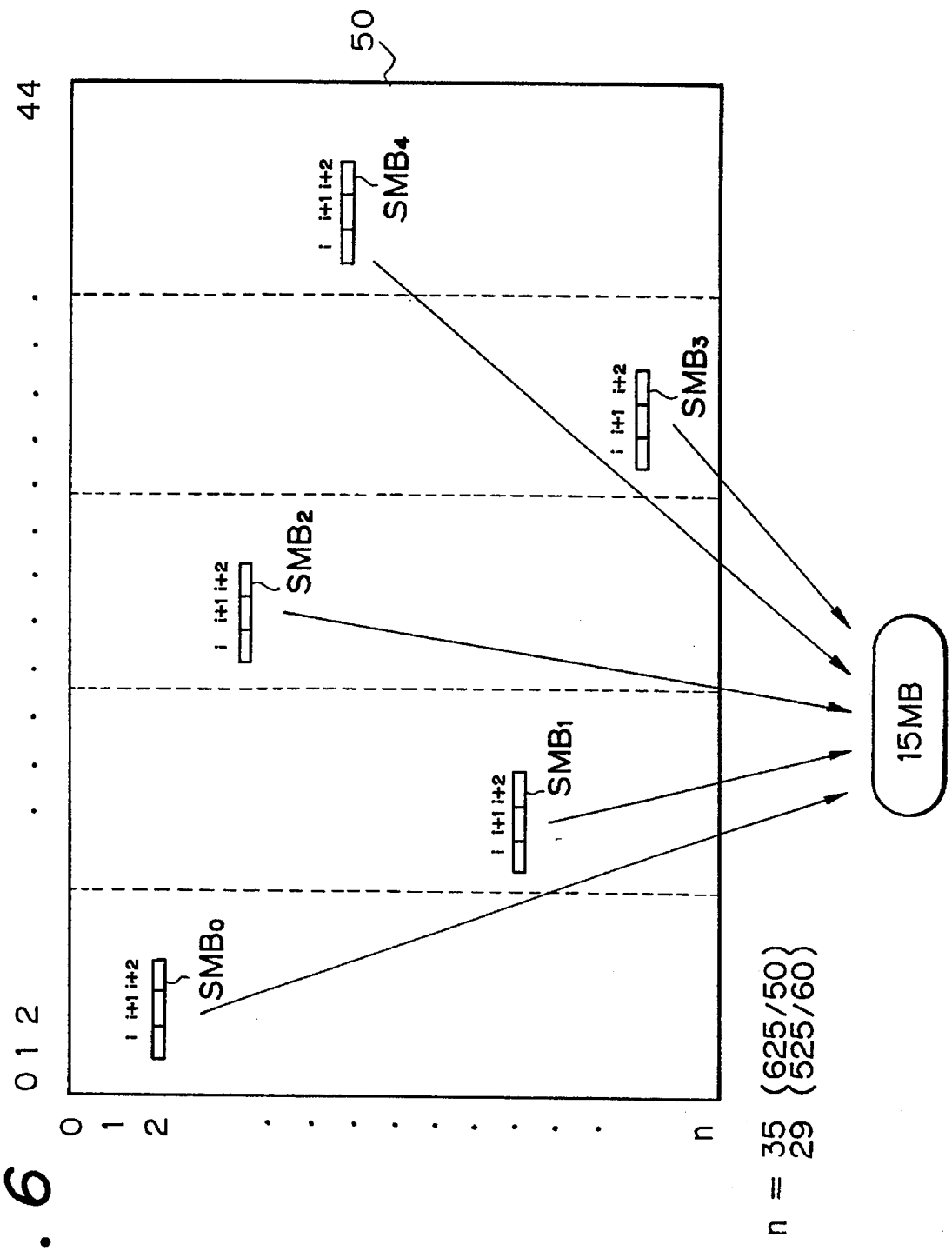
FIG. 6 illustrates a macro block shuffling process carried out by a shuffling circuit of the FIG. 1 embodiment.

In addition, the manner in which the shuffling process is carried out in accordance with the embodiment of FIG. 1 facilitates interpolation of the video signals upon reproduction to permit recovery of data lost as a consequence of head clogging or longitudinal scratches in the video tape on which the signals are recorded. Referring also to FIG. 6, the shuffling circuit 5 shuffles the super macro blocks of each video field corresponding with a video screen 50 by collecting them in groups of five super macro blocks wherein each of the five super macro blocks within each group is selected from a respectively different area of the video screen. In FIG. 6, the video field is arranged as 45 macro blocks in the horizontal direction of the screen 50 by (n+1) macro blocks in the vertical direction thereof. In this embodiment, n=29 for an NTSC signal having 525 lines per frame and n=35 for a PAL signal having 625 lines per frame. As illustrated in FIG. 6, the shuffling process is carried out by selecting one super macro block $SMB_0$, $SMB_1$ . . . , $SMB_4$ from each of five corresponding, horizontally separated areas of the video field to assemble each group thereof. The selection of the super macro blocks in this fashion is carried out so that the their horizontal positions do not match. As thus collected in accordance with the shuffling process, the groups of fifteen macro blocks (that is, groups of five super macro blocks) are treated as individual buffering units.

Figure 7:
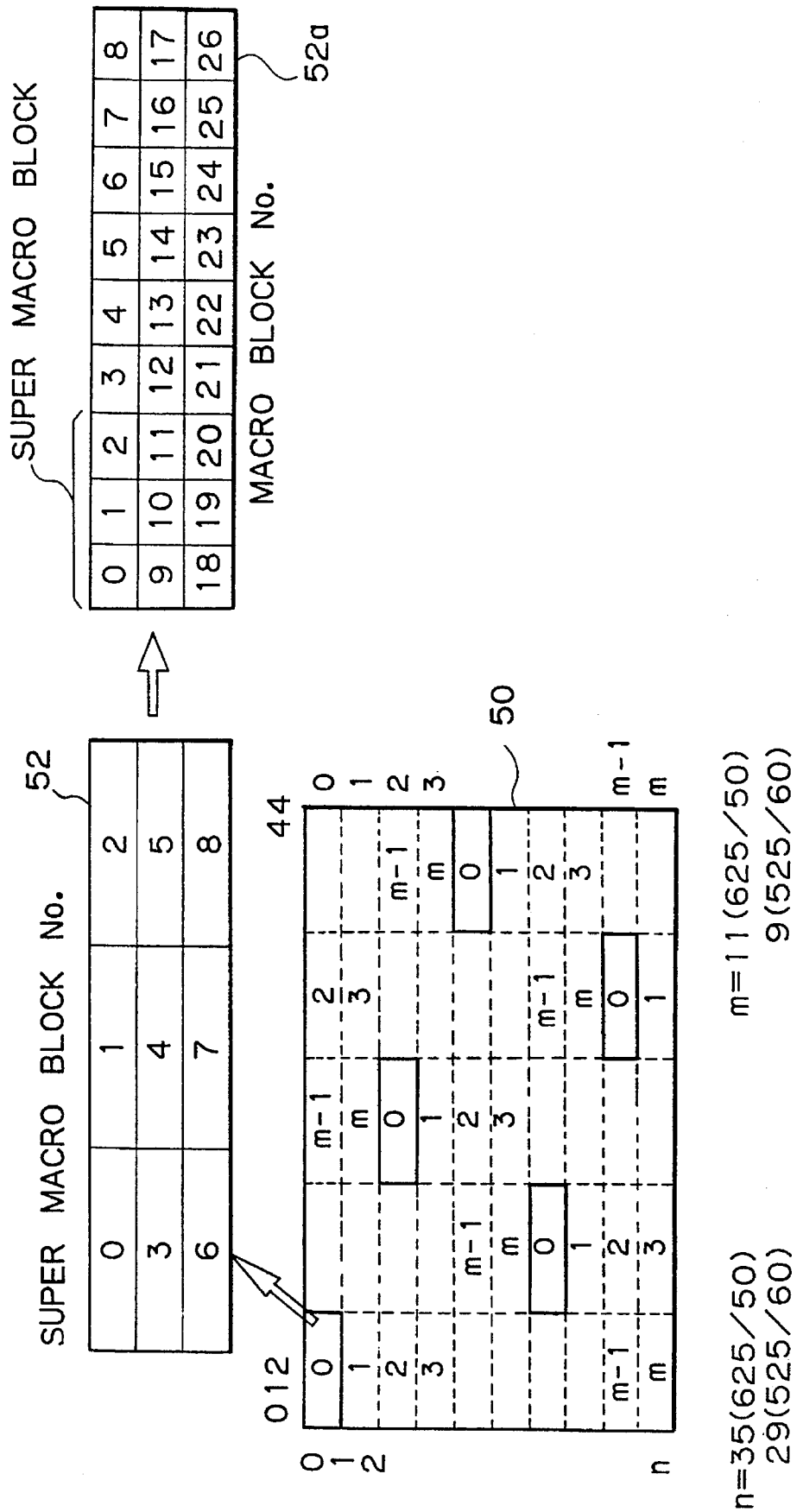
FIG. 7 schematically illustrates the division of a video screen into a plurality of sub-areas each including a plurality of super macro blocks in accordance with the macro block shuffling process of FIG. 6.

The shuffling process illustrated in FIG. 6 is now described in greater detail with reference also to FIG. 7. In FIG. 7, the video screen 50 of FIG. 6 for each of odd and even video fields is illustrated in greater detail wherein the five horizontally separated areas of the screen are each subdivided into (m+1) vertically disposed sub-areas corresponding with a number of recording tracks in which the shuffled signals of the video field corresponding with the screen 50 are recorded on a video tape. Video signals conforming with the NTSC system are recorded as one field for every ten tracks, so that m=9. In the case of PAL component video signals, each field is recorded in twelve corresponding tracks on tape, so that m=11 in this instance. Each of the sub-areas within the five areas of the screen 50 is assigned a number 0, 1, . . . m so that the positions of sub-areas having corresponding numbers are dispersed throughout the screen 50.

The arrangement of the super macro blocks within each sub-area is illustrated schematically by the sub-area 52 in FIG. 7. It will be seen that each sub-area 52 includes an array of three-by-three super macro blocks numbered 0 through 8. The arrangement of the macro blocks within each of the sub-areas 52 is illustrated as the modified depiction 52a of the sub-area 52 in FIG. 7. In the modified depiction 52a, the macro blocks are numbered 0 through 26, so that it will be seen that each super macro block of the area 52 includes three horizontally adjacent macro blocks as illustrated in the modified depiction 52a.

Figure 8:
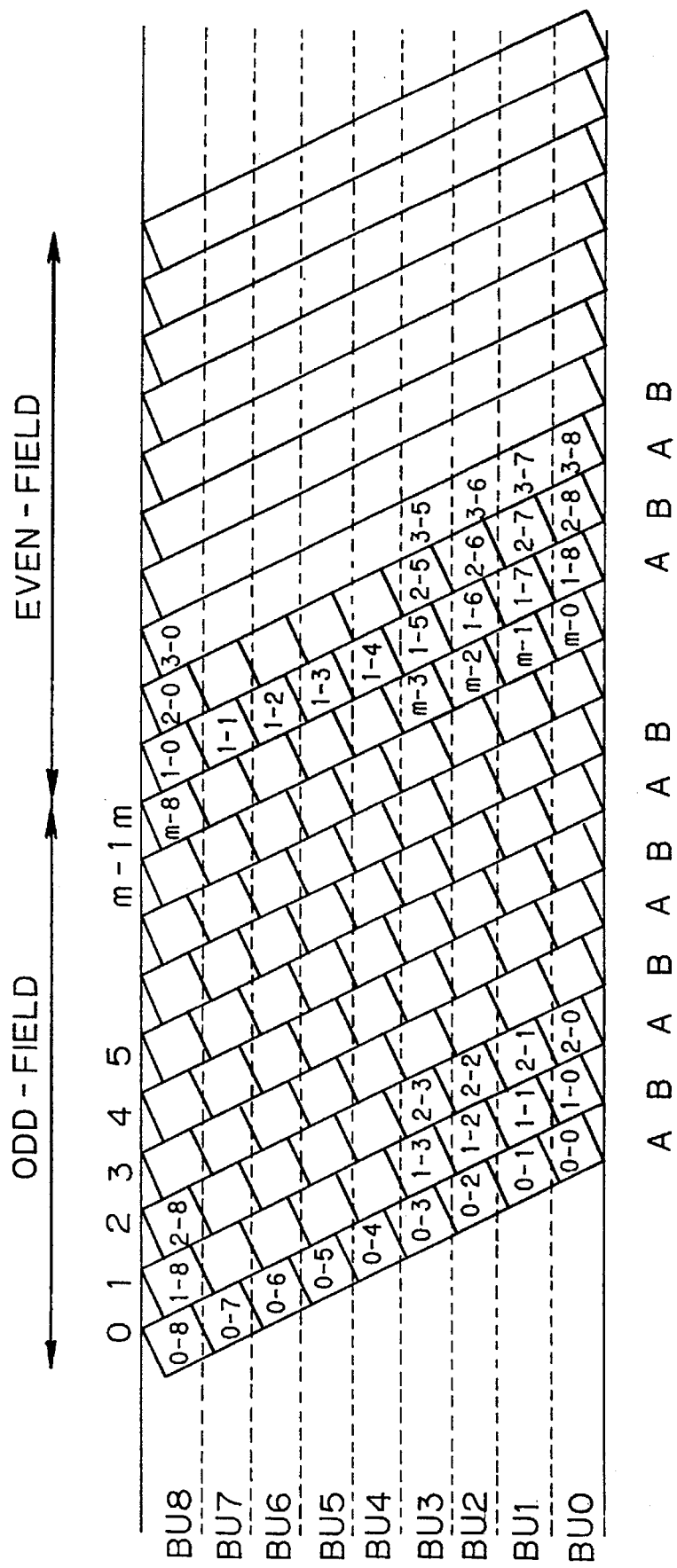
FIG. 8 illustrates a recording pattern for recording odd and even fields of digital video signals shuffled in accordance with the process illustrated in FIGS. 6 and 7.

The manner in which the buffering units each including 15 macro blocks, as described above, are assembled in accordance with the shuffling process for recording on video tape is now described in greater detail. Each of the super macro blocks is designated by the parameters (p, q) wherein p=0, 1, . . . m designates the sub-area from which the super macro block has been obtained and q=0, 1, . . . 8 indicates the position of the super macro block within the sub-area p. In accordance with the shuffling process for an odd field of the video signal, each of the five super macro blocks having the parameters (0, 0), that is, the super macro blocks at position 0 from each of the five sub-areas 0, are collected to form a buffering unit. Subsequently, the super macro blocks (0, 1) from each of the five sub-areas 0 are collected to form a further buffering unit. In order thereafter, buffering units respectively including the super macro blocks (0, 2), (0, 3), . . . (0, 8) are constructed. With reference also to FIG. 8, the manner in which the various buffering units are recorded in respective slant recording tracks by alternate ones of a pair of recording/reproducing heads A and B via respective channels A and B is illustrated therein. As shown in FIG. 8, a slant recording track 0 of an odd video field includes the buffering units composed respectively of the super macro blocks (0, 0) through (0, 8) in order as the track 0 is scanned by a respective one of the heads. The designations BU0, BU1 . . . BU8 in FIG. 8 identify sequential buffering unit locations within each of the recording tracks of the video tape, so that the positions of the buffering units including super macro blocks (0, 0), (0, 1), . . . (0, 8) are located at positions BU0, BU1, . . . BU8 in track 0 of the tracks recording the odd video field.

Once the data of the five sub-areas 0 of the odd video field have been recorded in a corresponding slant recording track as illustrated in FIG. 8, a series of buffering units including the super macro blocks numbered 0 through 8, respectively, of the five sub-areas 1 of the odd video field are collected for recording in the following slant track. That is, first the super macro blocks (1, 0) are assembled as a buffering unit composed of the super macro blocks 0 from each of the five sub-areas 1 for recording in the slant track 1 of the odd field at track position BU0 thereof as illustrated in FIG. 8. Thereafter, a buffering unit including the super macro blocks (1, 1) of the five sub-areas 1 is assembled for recording in the position BU1 of the track 1 in FIG. 8. In order thereafter, the super macro blocks (1, 2), (1, 3), . . . (1, 8) are assembled for recording in sequence in the track 1. In the same fashion and in numerical order, eight buffering units for each of the sub-areas 2, 3, . . . m are assembled for recording in the tracks 2, 3, . . . m of the odd video field as illustrated in FIG. 8.

When the subsequent even video field is recorded, the order in which the super macro blocks within each sub-area are assembled into buffering units is changed so that the super macro blocks 8, 7, . . . 0 in each of the sub-areas 1, 2, . . . m, 0 are recorded successively in respective slant tracks at positions BU0, BU1, . . . BU8 as illustrated in FIG. 8 for the even video field. It will be seen that the order in which the data from the various sub-areas of the even video field are recorded in the slant tracks is changed from that of the odd field so that the data within the sub-areas of the even video field are recorded in sequential slant tracks in the order of sub-areas 8, 7, . . . , 0. Accordingly, in shuffling the data of the even video field for recording, initially the data of the five super macro blocks (1, 8) are assembled in a buffering unit for recording in the position BU0 of the first slant track recording the even video field data. Thereafter, the super macro blocks (1, 7), (1, 6), . . . (1, 0) are assembled in buffering units for recording at the positions BU1, BU2, . . . BU8 of the first slant recording track for the even video field data.

Thereafter, the super macro blocks (2, 8) from each of the five sub-areas 2 of the even video field are assembled in a buffering unit for recording at the position BU0 of the next succeeding slant track. Thereafter, in order the super macro blocks (2, 7), (2, 6), . . . (2, 0) are assembled in respective buffering units and recorded in sequence at the positions BU1, BU2, . . . BU8 of the second slant track recording the even video field data. In like manner, the super macro blocks of each of the sub-areas 3, 4, . . . m, 0 of the even video field are recorded sequentially in respective slant recording tracks.

It will be seen, therefore, with reference to FIG. 8 that corresponding sub-areas of the odd and even fields are recorded by respectively different recording heads of the pair A and B. Therefore, should one of the heads A and B become clogged so that it is incapable of reproducing the recorded data of a given sub-area of a first one of the odd and even fields, the other head, if operable, will nevertheless be capable of reproducing the corresponding sub-area of the other one of the odd and even fields so that the data which could not be reproduced may nevertheless be reconstructed effectively through interpolation. It will also be seen that a longitudinal scratch in the video tape will in most cases affect differently located super macro blocks of the odd and even video fields so that the super macro blocks which could not be reproduced may in such cases nevertheless be reconstructed through interpolation utilizing the corresponding super macro blocks of the other field.

In greater detail, it will be seen that in the case of the odd fields, super macro blocks from even numbered sub-areas are assembled in buffering units for recording via a corresponding channel A by recording head A. In the case of the present embodiment, the head A first records the super macro blocks from the sub-areas 0 of the odd fields in a respective slant track, and thereafter records super macro blocks in respective slant tracks from each of the add-field sub-areas numbered 2, 4, 6 and 8. In the case of the even fields, however, the head A records the super macro blocks from the odd numbered sub-areas such that, in this example, the super macro blocks from the sub-areas numbered 1, 3, 5 and 7 are recorded by the head A in that order in respective slant tracks. Conversely, the super macro blocks of the odd video field from the odd numbered sub-areas are recorded by the head B, while the super macro blocks of the even video field from the even numbered sub-areas thereof are recorded by the head B.

If, for example, the head A (receiving data via channel A) is clogged so that it is unable to reproduce data, then the super macro blocks from even numbered sub-areas of the odd video fields will not be reproduced. However, the super macro blocks of the even numbered sub-areas within the even fields will nevertheless be reproduced so long as the head B is operative. Thus, the unrecoverable data can be reconstructed through interpolation. If, on the other hand, only the head B is inoperative, although the super macro blocks from the odd numbered sub-areas within the odd fields cannot be reproduced, the super macro blocks from the odd numbered sub-areas within the even numbered fields can nevertheless be reproduced by the head A so long as it is operative. Accordingly, in this case as well, the unreproducible data can be recovered through interpolation. Moreover, it will be seen that in the first disclosed embodiment, the super macro blocks are arranged within each track according to a first order, namely in the order (x, 0), (x, 1), and so on, in the case of odd video fields. However, for the even video fields, the super macro blocks are recorded in a respectively different order, namely in the order (x, 8), (x, 7) and so on. Accordingly, in the event that an error should occur in the longitudinal direction of the tape, for example, due to scratching, since the order in which the data is recorded is switched between the odd and even fields, the unreproducible data may be recovered through interpolation in most cases.

For example, if due to a longitudinal error, all of the data within the first buffering unit BU0 of each track becomes unreproducible, all of the data for the super macro blocks (0, 0), (1, 0), (2, 0), and so on within the odd video fields which correspond with the buffering unit BU0 are thus unreproducible. However, in the case of the even numbered fields, differently located super macro blocks are affected by the same longitudinal error, in this case, the super macro blocks (1, 8), (2, 8), (3, 8), and so on. Therefore, the data within the buffering units including the super macro blocks numbered 0 within the even numbered fields are unaffected by this particular longitudinal error so that they may nevertheless be reproduced. Consequently, the super macro blocks numbered 0 within the odd numbered frames may be recovered through interpolation utilizing the corresponding data of the even numbered fields. On the other hand, the super macro blocks 8 of the even video field may be reconstructed with the use of the super macro blocks of the corresponding areas of the odd fields which are unaffected by the particular longitudinal error.

In the disclosed embodiment, the data is recorded sequentially in odd and even fields. It will be appreciated that, in the alternative, the data may be arranged as a sequence of frames which are divided into a plurality of regions or sub-areas, for example, in the manner described above. Then, a respective shuffling sequence is established for odd and even numbered frames to vary the order and locations in which the data of the various regions or sub-areas are recorded in the respective tracks.

Figures 9, 10:
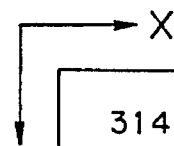
FIG. 9 illustrates an eight-by-eight block of video data in the time domain to be processed in accordance with discrete cosine transformation.
FIG. 10 illustrates frequency components resulting from the discrete cosine transformation of the eight-by-eight block of time domain data of FIG. 9.

After the data has been thus shuffled by the shuffling circuit 5, it is output to a discrete cosine transformation (DCT) circuit 6 of FIG. 1. The DCT circuit 6 serves to carry out a discrete cosine transformation of each of the DCT blocks included in each group of fifteen macro blocks received from the shuffling circuit 5. An exemplary discrete cosine transformation of an eight-by-eight DCT block will now be illustrated with reference to FIGS. 9 and 10. FIG. 9 illustrates an exemplary eight-by-eight pixel DCT block prior to transformation thereof by the circuit 6. In accordance with the discrete cosine transformation process carried out by the circuit 6, an orthogonal transformation of the time domain data in the DCT block is carried out to yield a corresponding block of data in the frequency domain. FIG. 10 illustrates DCT frequency components produced through the discrete cosine transformation of the values in the DCT block of FIG. 9. In FIG. 10, frequency components of the DCT block along the horizontal direction of the transformed data are arranged along the X axis such that the frequency thereof increases with increasing values of the X-coordinate. In like manner, the Y axis in FIG. 10 represents frequency components in the vertical direction of the eight-by-eight DCT block of FIG. 9. In the case of the Y axis, the Y-coordinate values are negative so that decreasing Y-coordinate values indicate increasing frequency of the corresponding components of the transformed block.

Since video frames exhibit correlation, upon the discrete cosine transformation of video signals the resulting DC component of a given transformed block is typically very large as compared with the AC components thereof. Accordingly, in the example of FIG. 10, the DC component located at the upper left hand corner of the transformed block as illustrated has a value of 314.91 which is approximately two orders of magnitude larger than the largest AC component thereof. In addition, lower frequency components of a given transformed block in general possess larger values than higher frequency components thereof. Generally speaking, the levels of the high frequency components become very small relative to the DC and lower frequency components. It will be appreciated that variable-length encoding of the AC component values by assigning appropriate numbers of bits thereto in accordance with their visual properties, results in a substantial decrease in the amount of data required to convey a corresponding amount of information. As an example, it was noted above that, by removing redundant portions of the data from the input video signal by means of the valid information extracting circuit 2, the transmission rate of the input video signal may be decreased from 216 MBPS to approximately 124 MBPS. Further, by virtue of the highly efficient coding process described above, the amount of data can be further decreased by a factor of approximately five. Consequently, the input transmission rate of 216 MBPS can be reduced to approximately 25 MBPS in this example.

As seen above, the DC component of each transformed video signal block typically possesses a very large value relative to the AC components thereof. The DC components are, therefore, the most important of the transformed data. Accordingly, unlike the AC components, the DC components are transferred directly without modification for reducing the amount of data therein. The AC components, however, are subjected to quantization and variable length encoding for recording as described in greater detail hereinbelow.

In general, the AC components of fifteen grouped macro blocks (that is, the five super macro blocks grouped together by the macro-block composing circuit 4) as output by the DCT circuit 6 are stored temporarily in a buffer memory 7. Thereafter they are output to a quantizer 8 for quantization and subsequently are variable length encoded by a variable length encoder 9 which serves to compress the amount of data therein. The quantizer 8 employs a selected set of quantization intervals to maintain the amount of data representing each frame substantially equal to a predetermined amount. Data indicating the selected set of quantization intervals is transmitted together with the DC components and the variable length encoded AC components, along with further information as described below.

In greater detail, the DC components supplied by the DCT circuit 6 are represented by a fixed length code and are provided directly to a frame segmentation and error correcting circuit 15 to be assembled with the remaining data for transmission and recording. At the same time that the AC components for a given fifteen macro-block group are stored in the buffer memory 7, the AC components are likewise supplied to a quantizer 10 which serves to quantize the components by weighting each thereof in accordance with its visual properties. That is, since higher frequency components do not possess high visibility, they are divided by a relatively large quantization interval in the quantization process. Due to the relatively greater visibility of the lower frequency components, however, they are divided by a relatively small quantization interval in this process.

With reference also to FIG. 11, in the disclosed embodiment, thirty-two predetermined sets of quantization intervals identified by quantization (Q) numbers 0 through 31 are provided to be used selectively by the quantizer 10. FIG. 12 schematically illustrates the arrangement of an eight-by-eight DCT block wherein groups of four adjacent pixels are designated as respective numbered areas 0–15. The horizontal axis of the table provided by FIG. 11 is arranged according to the numbered areas as illustrated in FIG. 12. It will be seen that each such area is assigned a corresponding quantization interval in accordance with the table of FIG. 11 when the Q number of a respective set of quantization intervals is specified. The relative sizes of the quantization intervals increase with increasing area number as well as with increasing Q numbers. Once the AC component values have been thus divided, they are rounded to nearest respective integer values in a manner determined according to their corresponding area numbers assigned as shown in FIG. 12. That is, divided component values with decimal remainders are rounded up if they fall within any of areas 0, 1, 2, 4, 6, 7, 9, 10, and 11, but are rounded down if they fall within any of areas 3, 5, 8, 12, 13, 14 and 15.

As an example, it is assumed that DCT transformed values as illustrated in FIG. 13 are produced by the DCT circuit 6 for a given DCT block. These values are supplied to the quantizer 10 which proceeds to divide all of the AC components (that is, all of the components included in FIG. 13 with the exception of the DC component value at the upper left hand corner thereof) with the use of a selected set of quantization intervals from the table of FIG. 11. If it is assumed that the set of quantization intervals designated by the Q number 9 is selected for use by the quantizer 10 (as described in greater detail hereinbelow) then the quantization intervals as illustrated in FIG. 14 are employed for dividing the AC component values from the respective areas 0–15 of FIG. 13 as defined in the manner illustrated in FIG. 12. Since, as described hereinabove, the resulting values having decimal remainders are rounded to one of the two nearest integer values, the quantized data as illustrated in FIG. 15 is provided by the quantizer 10 in this example.

The quantized data produced by the quantizer 10 is supplied to a transfer area determination circuit 11 which serves to determine the horizontal and vertical boundaries within each quantized data block beyond which the quantized data are uniformly equal to zero. In the example of the FIG. 15, these boundaries are X=4 and Y=5. Such horizontal and vertical boundaries define a transfer area (H, V), or (4, 5) in the example of FIG. 15, which is output by the transfer area determination circuit 11 as six bits of data, (100101) in the example of FIG. 15. The transfer area determination circuit 11 supplies the transfer area data to the frame segmentation and error correction coding circuit 15 described in greater detail hereinbelow.

The transfer area determination circuit 11 also supplies the quantized data received from the quantizer 10 to a code amount determination circuit 12. The circuit 12, by referencing a Huffman table 13, produces an estimate of the amount of variable length encoded data that would be produced by the quantizer 8 with the use of the selected set of quantization intervals employed by the quantizer 10. An exemplary Huffman table is set forth in FIG. 16 which illustrates the length of the code assigned to various values of quantized AC components or coefficients when they are encoded in the form of variable-length Huffman codes. In the example of the quantized AC components as illustrated in FIG. 15, each of the components within the transfer area is assigned a Huffman code having the number of bits in each case as illustrated in FIG. 17.

The code amount as determined by the circuit 12 is supplied to a quantizer selecting circuit 14 which serves to determine whether or not the amount of the quantized and variable length encoded data within the 15 macro blocks stored in the buffer memory 7 is less than a predetermined amount corresponding with a transfer rate of the digital VTR of the disclosed embodiment. When the amount of data is found to be not less than the predetermined amount, a new set of quantization intervals for use by the quantizer 10 is selected and then the amount of the variable length encoded data is once again determined by the circuit 14. It will be appreciated that through the appropriate selection of the set of quantization intervals for use by the quantizer 10, the amount of the encoded data can be made less than the predetermined amount.

Once the selection of the set of quantization intervals yields an amount of encoded data which is less than such predetermined amount, the data for the fifteen macro blocks stored in the buffer memory 7 are output to the quantizer 8 which employs the then selected set of quantization intervals for quantizing the received data. The quantized data is, in turn, supplied by the quantizer 8 to a variable length encoder 9 which serves to encode the received data into variable length data, for example, Huffman codes. The variable length encoded data is thereupon supplied by the encoder 9 to the frame segmentation and error correction coding circuit 15.

As noted above, the frame segmentation and error correction coding circuit 15 also receives the DC coefficient data for the fifteen macro blocks from the DCT circuit 6 as well as the transfer area data (H, V) from the transfer area determining circuit 11. The circuit 15 also receives data indicating the selected set of quantization intervals from the quantizer selecting circuit 14. The received data is then transformed by the frame segmentation and error correction coding circuit 15 into data frames, as described in greater detail hereinbelow, and the circuit 15 then adds an error correction code to the resultant data.

Figure 18:
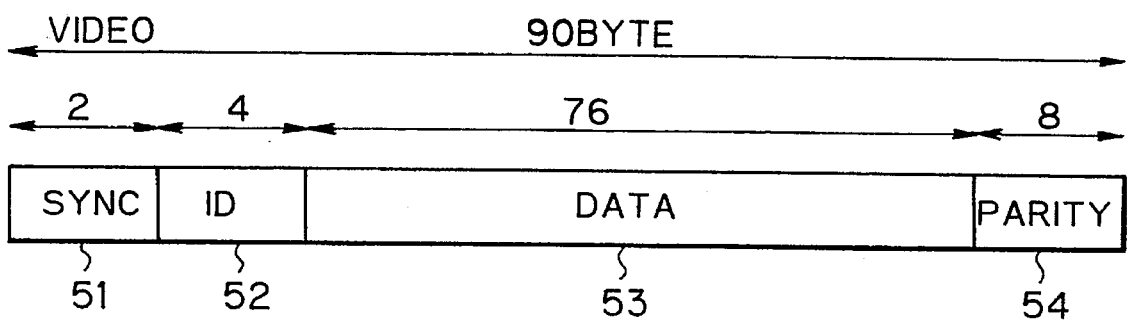
FIG. 18 illustrates the frame construction of a sync block including encoded video data and produced by a frame segmentation and error correction coding circuit of FIG. 1.

As illustrated schematically in FIG. 18, each data frame is arranged in a sync block format including ninety bytes. Two sync bytes 51 are arranged at the beginning of the sync block followed an ID 52 including four bytes of data. Following the ID 52 indicated as the data 53 are 76 bytes including DC component data and various variable-length encoded AC component data. Following the data 53 are eight bytes of parity data 54.

Figure 19:
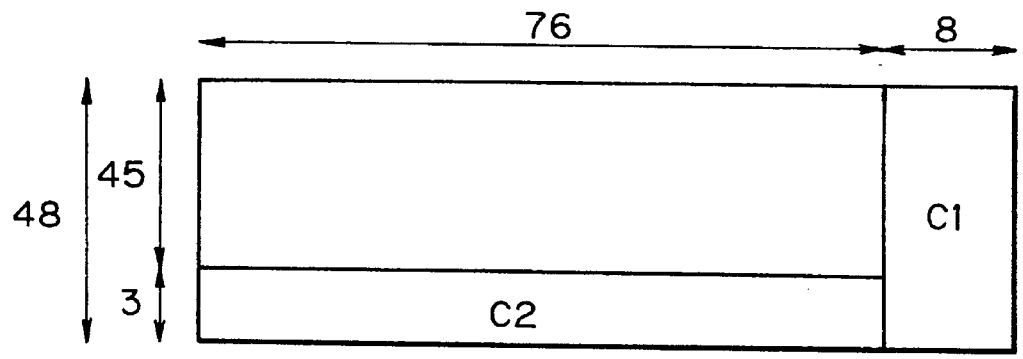
FIG. 19 illustrates an error correction coding process carried out by the frame segmentation and error correction coding circuit of FIG. 1.

FIG. 19 illustrates the error correction coding process carried out by the frame segmentation and error correction coding circuit 15. As illustrated in FIG. 19, the data is allocated in a 2-dimensional array of 76 bytes by 45 bytes and product codes are generated to form 8 bytes of a Reed-Solomon code in the horizontal direction indicated as the parity C1, while a 3 byte Reed-Solomon code is added in the vertical direction indicated as the parity C2 in FIG. 19.

Since as shown in FIG. 18 each data frame is arranged as a sequence of bytes, that is, as a sequence of fixed length data, the variable length encoded data will in some instances fall within more than one byte and in others will be represented by less than a byte of data. Accordingly, the boundaries of the variable length encoded data often will not correspond with the beginning of a given byte of data within the data frame and, should an uncorrectable error take place in any one byte, the boundaries of the variable length data following the uncorrectable byte will not be identifiable. Consequently, even if no error occurs in the remaining data, the inability to distinguish the following variable-length data one from the next will render all unusable and a propagation error will result.

Figure 20:
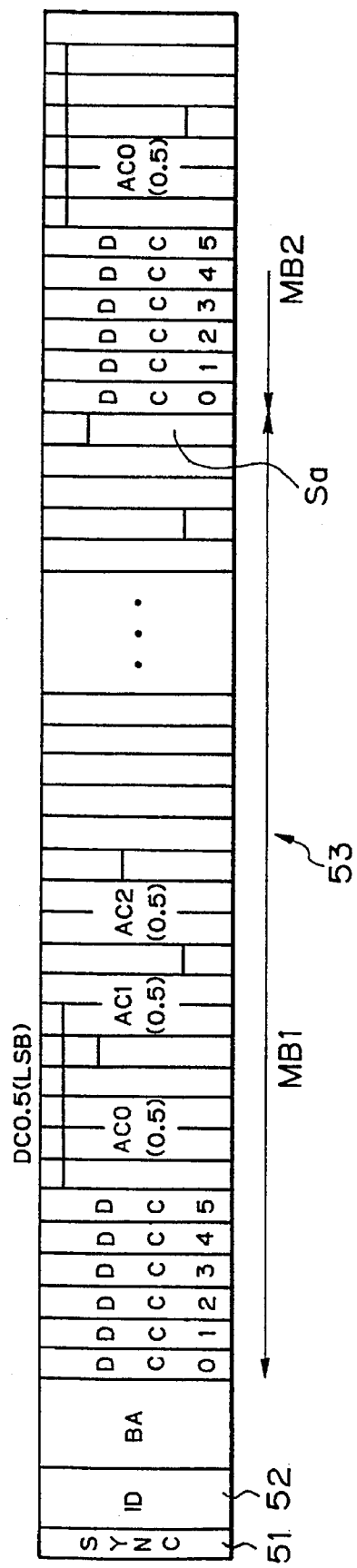
FIG. 20 illustrates the allocation of various types of data within a sync block produced by the frame segmentation and error correction coding circuit of FIG. 1.

The embodiment of FIG. 1 substantially alleviates this problem by advantageously allocating the data within a predetermined data sequence. An example of such an allocation arranges data within a data frame in the manner illustrated in FIG. 20. As illustrated in FIG. 20, following the ID 52, a block address BA is inserted. Following the block address BA the fixed length DC components and variable length encoded AC components of a first macro block MB1 (including four luminance signal blocks and two respectively different color difference signal blocks, as described hereinabove) are inserted. Included within the first macro block are the fixed length encoded DC component data of the six blocks thereof indicated as DC0 through DC5 in a group of six sequential bytes. Following the DC component data are the variable length encoded AC components of the six blocks arranged in groups of AC components representing corresponding frequency ranges for each of the six blocks. The groups of AC components are indicated as ACn, n=0, 1, 2 . . . , wherein n represents a corresponding frequency range of the AC components arranged to begin with the lowest frequency range (n=0) and followed by successively higher frequency ranges n-1, 2, . . . . Accordingly, the AC components are arranged in the order of ascending frequency range within the macro block MB1.

A second macro block MB2 having the same format as the macro block MB1 is arranged to follow the macro block MB1. However, the beginning of the macro block MB2 and each succeeding macro block corresponds with the beginning of a symbol or byte within the data sequence. Accordingly, if the data of the macro block MB1 (or any succeeding macro block) ends in a position other than the end of a symbol or byte, a space is created between the macro blocks. In that event dummy data is placed in the space. A space between the macro blocks MB1 and MB2 is represented in FIG. 20 by the area Sa. The block address BA preceding the macro block MB1, as described hereinabove, indicates the location of the beginning of the following macro block MB2 in the data sequence.

With reference again to FIG. 1, the data sequence thus produced by the frame segmentation and error correction coding circuit 15 is supplied thereby to a channel encoder 16 which modulates the data stream for recording on magnetic tape in accordance with a predetermined modulation technique. The thus-modulated data is output by the channel encoder 16 to recording heads 18A and 18B through recording amplifiers 17A and 17B, respectively, to be transmitted thereby for recording on magnetic tape.

Figure 21:
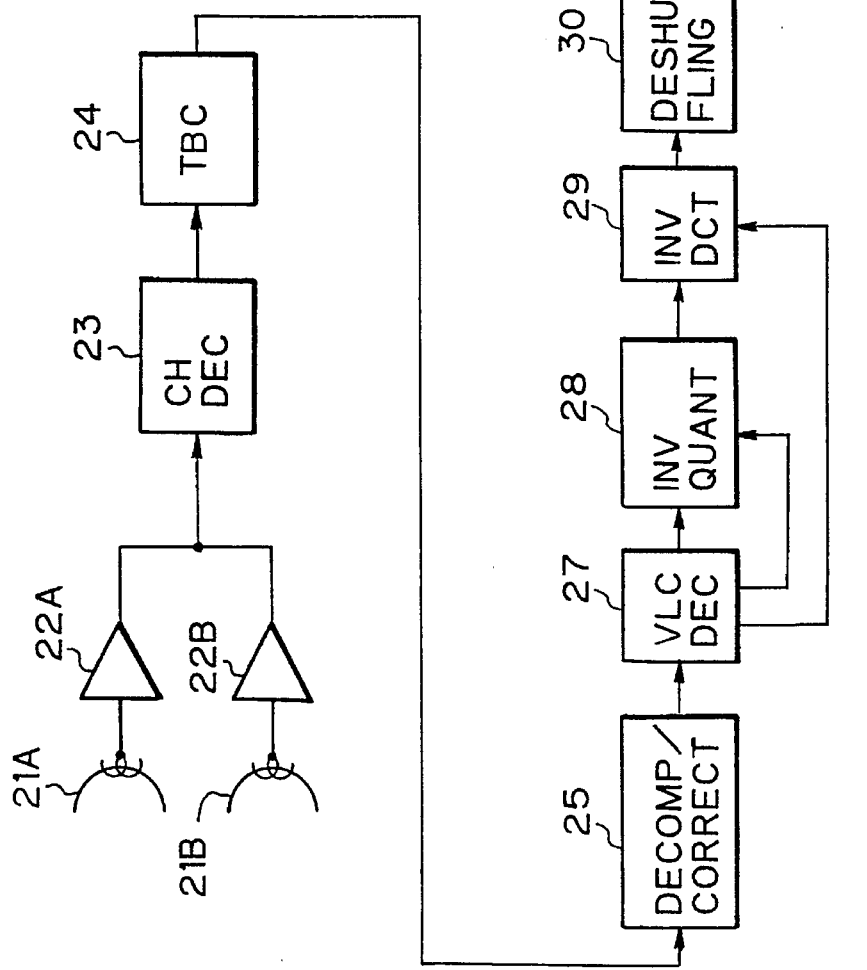
FIG. 21 is a block diagram of a reproducing system of the digital VTR of FIG. 1.

Referring now to FIG. 21, a reproducing system of the digital VTR of the disclosed embodiment is illustrated in block format therein. The reproducing system includes reproducing heads 21A and 21B which supply signals reproduced from a magnetic tape to a channel decoder 23 through respective reproducing amplifiers 22A and 22B. The channel decoder 23 serves to demodulate the reproduced data in accordance with a process complementary to that of the modulation process carried out by the channel encoder 16 of the recording system. The demodulated reproduction signals are supplied by the channel decoder 23 to a time base compensation (TBC) circuit 24 which serves to remove time-base fluctuation within the reproduced signals.

The time-base compensated reproduced signals are output by the TBC circuit 24 to a frame decomposition and error correction processing circuit 25 which is operative to correct errors in the reproduced data. The circuit 25 also serves to separate the variable-length encoded AC component data, the DC component data and the additional information including the transfer area information (H, V) and the data indicating the selected set of quantization intervals for the reproduced data. The variable-length encoded AC component data are supplied to a variable length decoder 27 which is operative to decode the Huffman-encoded AC component data. The decoded AC component data is supplied by the decoder 27 to an inverse quantizing circuit 28 whose operational characteristics are determined in accordance with the data included in the reproduced signal indicating the set of quantization intervals employed for quantizing the corresponding data. The data thus subjected to inverse quantization by the circuit 28 is, in turn, supplied to an inverse DCT circuit 29 which transforms the frequency domain data back into time domain data and supplies the thus-transformed data to a deshuffling circuit 30. The deshuffling circuit 30, in turn, carries out a deshuffling process which is the inverse of the shuffling process carried out by the circuit 5 of the recording system illustrated in FIG. 1.

Once the data has been deshuffled by the circuit 30, it is then supplied to a macro-block decomposition circuit 31 which serves to separate the macro-block data into DCT blocks including the component signals Y, U and V. The macro-block decomposition circuit 31 then supplies the separated macro-block data to block decomposition circuits 32A, 32B and 32C which serve, respectively, to separate the Y, U and V components of the received DCT blocks into data corresponding with a valid screen.

The component signals Y, U and V are then supplied by the circuits 32A–32C to an additional information interpolation circuit 33 which serves to interpolate the components U and V in order to reconstruct the color difference signals U and V. The circuit 33 also adds horizontal and vertical blanking interval signals to the component signal Y, U and V which it then supplies at output terminals 34A, 34B and 34C, respectively, of the reproducing system of FIG. 21.

Figure 22:
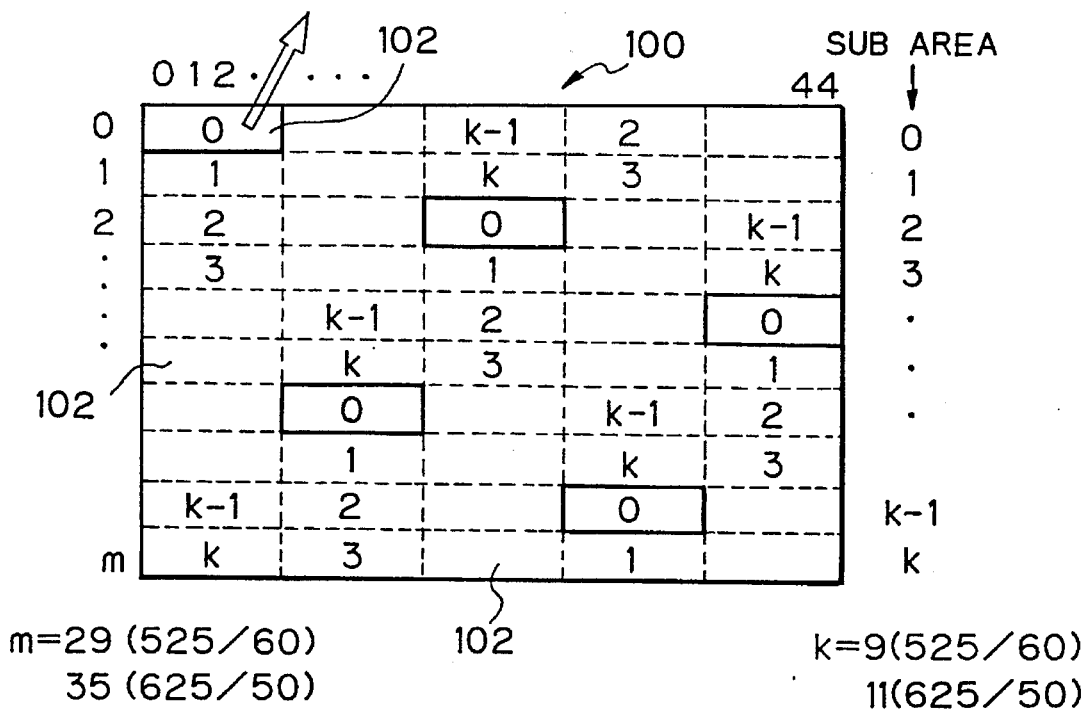
FIG. 22 illustrates a manner of dividing a video screen into a plurality of sub-areas each including a plurality of macro blocks in accordance with a second embodiment of the present invention.

A second embodiment of a digital VTR in accordance with the present invention is constructed in the same manner as illustrated in FIG. 1. However, in the second embodiment the operation of the shuffling circuit corresponding with the shuffling circuit 5 of FIG. 1 is modified in the manner described hereinbelow. The modified shuffling circuit 40 assembles the macro blocks in buffering units of five macro blocks, one each from like-numbered sub-areas of the video screen. With reference to FIG. 22, the modified shuffling circuit divides a video screen 100 representing odd and even fields of a video signal into sub-areas in the same manner as the shuffling circuit 5 of the FIG. 1 embodiment. However, in the second embodiment as illustrated in FIG. 22, each of the sub-areas illustrated schematically as the sub-area 102 is not divided into super macro blocks. Rather, each of the sub-areas 102 is divided into twenty-seven macro blocks numbered 0, 1, . . . 26 according to the position thereof within its respective sub-area 102. Accordingly, each of the macro blocks within the video screen 100 is designated by parameters (p, q) wherein the parameter p indicates the number of the sub-area of the macro block and the parameter q indicates the position of the macro block within its respective sub-area, as illustrated in FIG. 22. It will be seen from FIG. 22 that the sub-areas of each field are arranged in such a way that the distance of the sub-areas identified by the same sub-area number in adjacent ones of the five horizontally spaced areas is maximized. In the example of FIG. 22, the distance between the like-numbered sub-areas within the adjacent areas is equal to six sub-areas.

The data included in the five sub-areas denoted by each of the sub-area numbers 0, 1, . . . k of each field are all recorded in a respective track of a video tape. To form buffering units, five like-numbered macro blocks are collected from each of five like-numbered sub-areas to form a buffering unit. For example, macro blocks (0, 0) are assembled as a buffering unit including the macro blocks numbered 0 from each of the sub-areas numbered 0.

Figure 23:
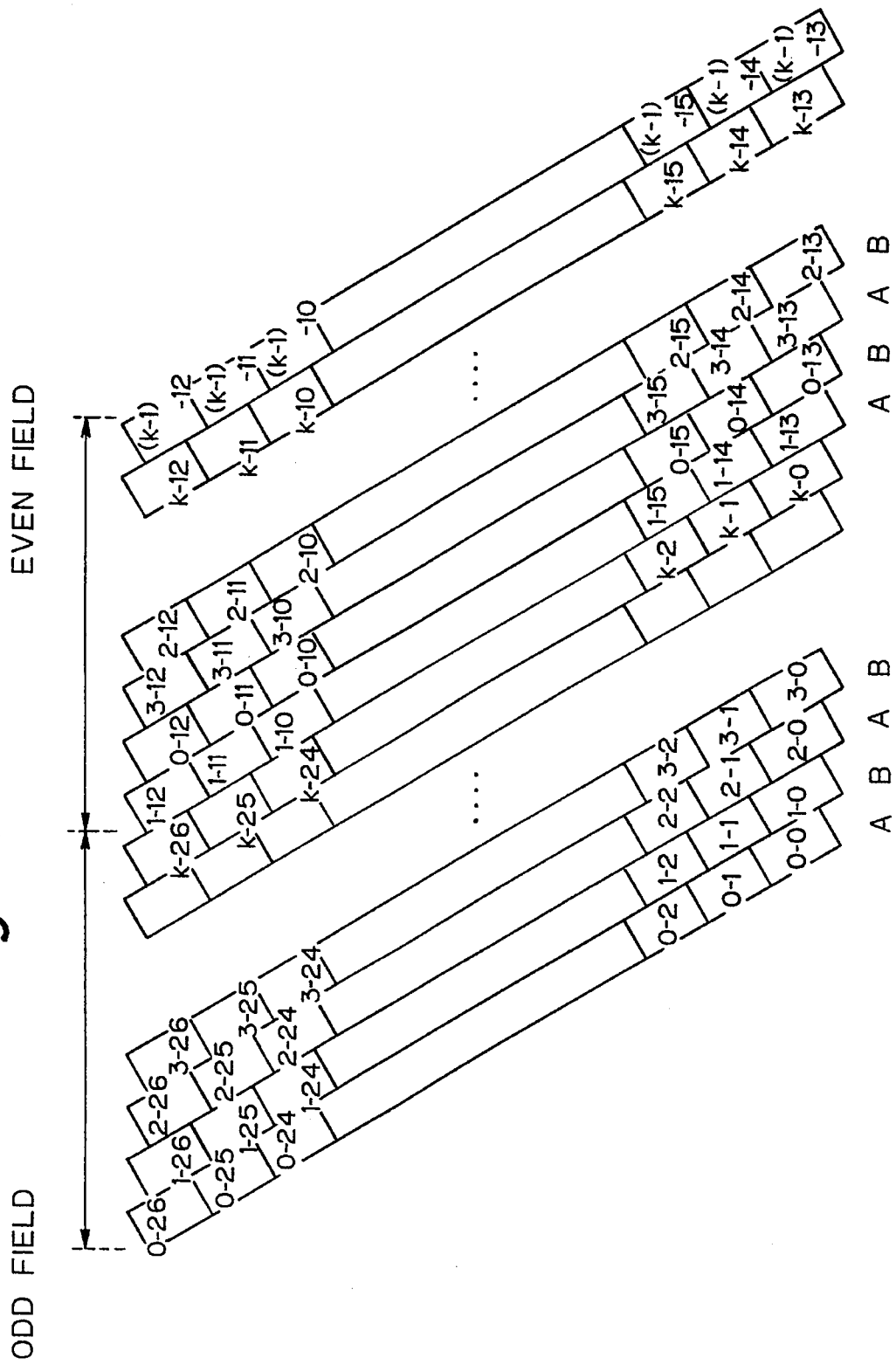
FIG. 23 illustrates a sequence of slant recording tracks on a video tape illustrating a pattern for recording odd and even fields of a video signal shuffled in accordance with the process illustrated in FIG. 22.

As in the case of the FIG. 1 embodiment, the shuffled video data is then discrete cosine transformed, buffered, and variable-length encoded. Subsequently, the resulting data is recorded on a magnetic tape. With reference also to FIG. 23, the recorded data within two successive fields are recorded in successive tracks in the format illustrated therein. It will be seen that the sequence for recording the data of the odd video fields differs from that adopted for the data of the even video fields. By virtue of the shuffling process thus implemented, the influence of errors resulting from head clogging or longitudinal scratches in the tape can be reduced by facilitating error correction.

More particularly, each of the fields is recorded in (k+1) tracks arranged sequentially on the tape. In the case of the odd video fields, the data within the various sub-areas are recorded in respective sequentially arranged slant recording tracks beginning with the data from the sub-areas numbered 0 and continuing in sequence up to and including the sub-areas numbered k. Moreover, within each of the tracks, the macro blocks of the respective sub-area are recorded in sequence beginning with the macro blocks numbered 0 successively through the macro blocks numbered 26 along the scanning direction of the respective recording track. Accordingly, as illustrated in FIG. 23, in the case of the odd video fields, the data from the sub-areas designated by even numbers are recorded by the head A, while the data from the sub-areas having odd numbers are recorded by the head B.

On the other hand, in the case of the even video fields, the head A records the data from the odd numbered sub-areas, while the head B records the data from the even numbered sub-areas. In addition, in the case of the even field the macro blocks from the respective sub-areas are recorded in the corresponding slant tracks in an order differing from that in which the macro blocks are recorded in each of the slant tracks of the odd video fields. That is, in each of the slant tracks recording the even video field data, the macro blocks are recorded beginning with the macro blocks 13 through 26, followed by the macro blocks 0 through 12.

Figure 24:
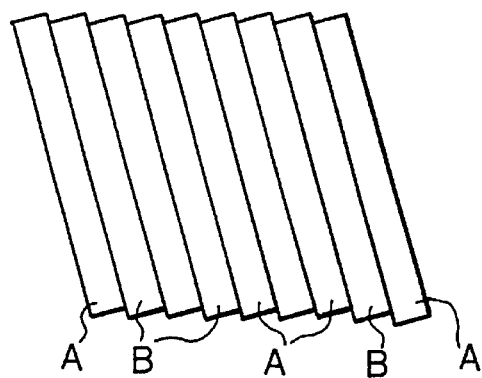
FIG. 24 illustrates the manner in which each of a pair of recording/reproducing heads of a digital VTR in accordance with the second embodiment of the present invention scans alternate ones of a sequence of slant recording tracks on a video tape.
Figure 25A:
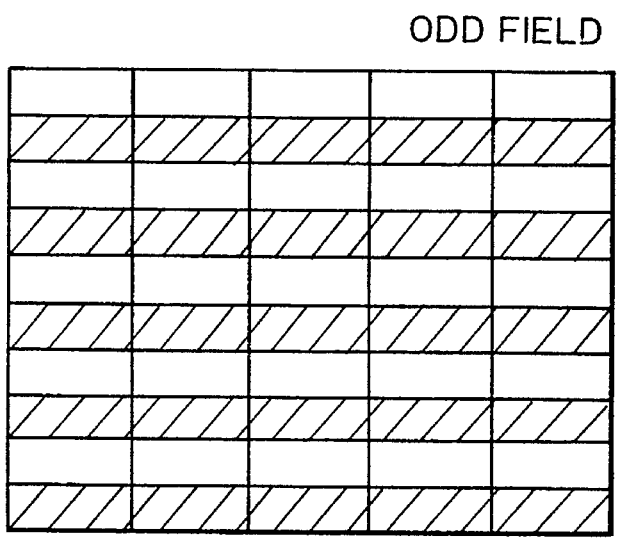
FIG. 25 illustrates a pattern produced upon reproduction of digital video data recorded as illustrated in FIG. 23 when one of a pair of reproducing heads has become clogged.
Figure 25B:
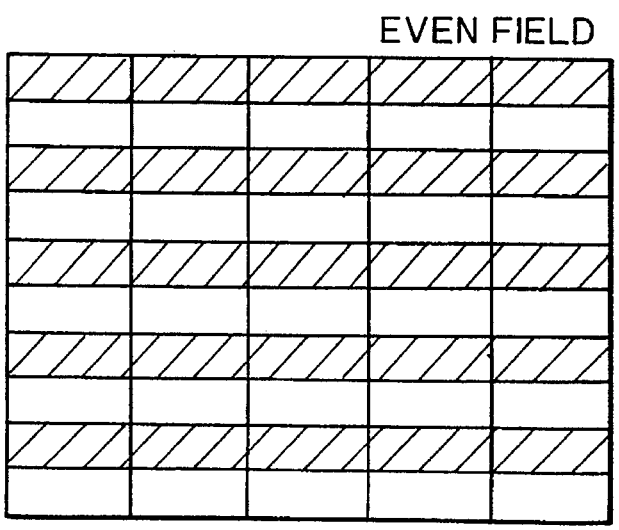

Referring also to FIG. 24, it will be seen that if one of the video heads B should become clogged, the data from every other one of the slant recording tracks cannot be reproduced. However, so long as the head A remains operative, the data within the regions of the odd and even numbered fields indicated by the unhatched sub-areas thereof in FIG. 25 will nevertheless be reproduced by the head A. It will be seen from FIG. 25 that the reproduced data from each of the odd and even fields provides the ability to reconstruct through interpolation the data of the other field which has been lost.

Figure 26:
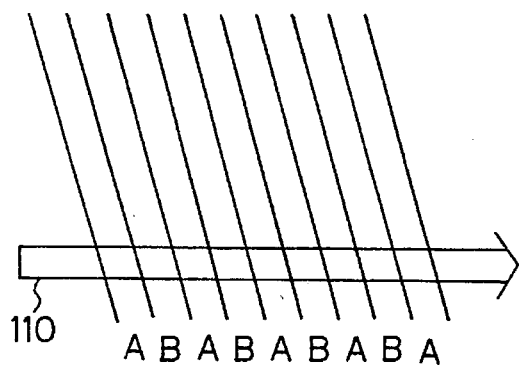
FIG. 26 illustrates the portions of sequential slant recording tracks on a video tape which suffer data loss as a consequence of a longitudinal scratch in the tape.
Figure 27A:
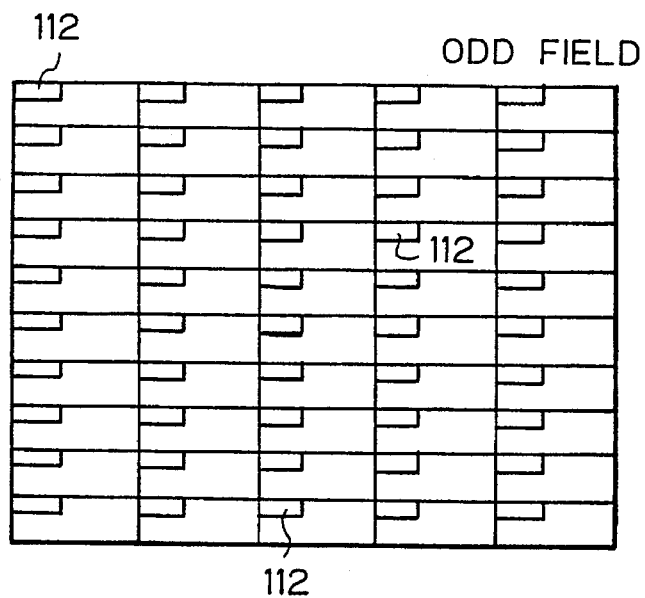
FIG. 27 illustrates a manner in which data recorded as illustrated in FIG. 23 are affected upon reproduction when data is lost due to a longitudinal scratch in the magnetic recording tape.
Figure 27B:
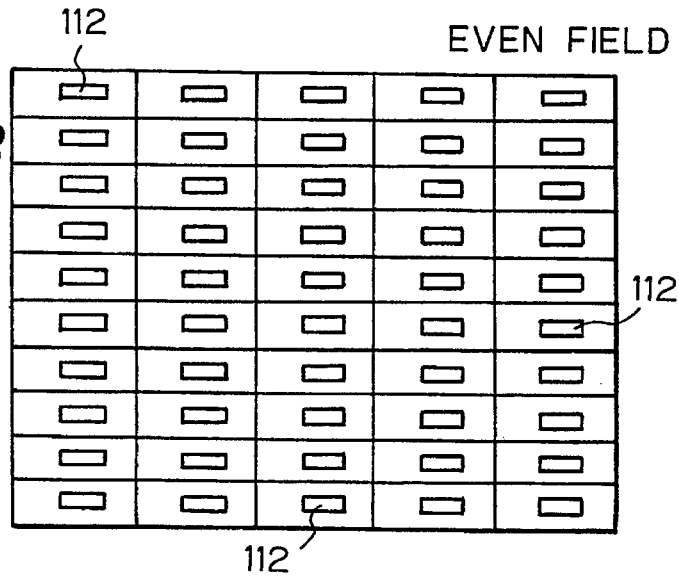

FIG. 26 illustrates the effect of a longitudinal scratch in the magnetic tape. In the example of FIG. 26, it is assumed that the longitudinal scratch indicated by the arrow 110 therein has resulted in the loss of data from the buffering unit positions BU0, BU1 and BU2. FIG. 27 illustrates the consequent effects within each of the odd and even numbered fields. That is, in each case, the data within the rectangular areas 112 within each of the sub-areas of each field has been lost as a consequence of the longitudinal defect in the magnetic tape. The different respective effects experienced within the sub-areas of the odd and even fields are due to the different respective order in which the macro blocks are recorded within each slant recording track recording the odd and even video field data. In this example, in the case of the odd video fields, the macro blocks numbered 0, 1 and 2 have been lost, whereas in the case of the even video fields, the data of the macro blocks numbered 13, 14 and 15 have been lost. It will be seen, therefore, that in each instance where data has been lost, data from the corresponding regions of the other field may be utilized to reconstruct the lost data by interpolation.

Accordingly, the present invention by recording the data from corresponding regions within different respective video signal intervals at different locations within corresponding groups of recording tracks provides the ability to easily recover data which has been lost as a consequence of head clogging or tape scratching. Moreover, since in certain embodiments of the present invention the data is grouped as super macro blocks including a plurality of adjacent macro blocks, the visibility of the reproduced image is thereby improved when a cue or review operation is carried out.

It will be appreciated that methods and apparatus in accordance with the present invention may, for example, be implemented in whole or in part with the use of hardwired circuits or with the use of a microprocessor, microcomputer, or the like.

Although specific embodiments of the invention have been described in detail herein with reference to the accompanying drawings, it is to be understood that the invention is not limited to the disclosed embodiments, and that various changes and modifications may be effected therein by one skilled in the art without departing from the scope or spirit of the invention as defined in the appended claims.

What is claimed is:

1. A method of recording component color video signals representing at least a portion of a video screen in a plurality of tracks on a recording medium, said video screen having a plurality of sections each of the sections including a respective plurality of sub-areas, each of said sub-areas of each said section being located at a position in that section corresponding to the same position in other sections at which is located corresponding sub-areas, the component color signals including a luminance signal and first and second color difference signals, comprising the steps of:

dividing the luminance signal and first and second color difference signals into a plurality of DCT blocks each representing a respective subdivision of the video screen and selected to permit discrete cosine transformation thereof;

collecting the DCT blocks of each of the luminance signal and first and second color difference signals into respective macro blocks including signals representing at least one common respective subdivision of the video screen;

assembling super macro blocks each including a plurality of macro blocks representing adjacent subdivisions of the video screen in a respective sub-area;

arranging the super macro blocks in a sequence such that adjacent super macro blocks in the sequence are assembled from sub-areas in different sections at non-corresponding positions;

carrying out a discrete cosine transformation of each of the DCT blocks; and recording the transformed DCT blocks assembled in said super macro blocks such that the super macro blocks are arranged in said sequence in the plurality of tracks on the recording medium.

2. The method of claim 1, wherein the video screen has horizontal and vertical dimensions, and said sub-areas at said non-corresponding positions in different sections are separated in position along the horizontal dimension.

3. The method of claim 1, wherein the video screen has horizontal and vertical dimensions, and said sub-areas at said non-corresponding positions in different sections are separated in position along the vertical position.

4. The method of claim 3, wherein the non-corresponding positions of said different sections are selected to maximize a vertical distance therebetween.

5. An apparatus for recording component color video signals representing at least a portion of a video screen in a plurality of tracks on a recording medium, said video screen having a plurality of sections each of the sections including a respective plurality of sub-areas, each of said sub-areas of each said section being located at a position in that section corresponding to the same position in other sections at which is located corresponding sub-areas, the component color signals including a luminance signal and first and second color difference signals, comprising:

means for dividing the luminance signal and first and second color difference signals into a plurality of DCT blocks each representing a respective subdivision of the video screen and selected to permit discrete cosine transformation thereof;

means for collecting the DCT blocks of each of the luminance signal and first and second color difference signals into respective macro blocks including signals representing at least one common respective subdivision of the video screen;

assembling means for assembling super macro blocks each including a plurality of macro blocks representing adjacent subdivisions of the video screen in a respective sub-area;

arranging means for arranging the super macro blocks in a sequence such that adjacent super macro blocks in the sequence are assembled from sub-areas in different sections at non-corresponding positions;

means for carrying out a discrete cosine transformation of each of the DCT blocks; and means for recording the transformed DCT blocks assembled in said super macro blocks such that the super macro blocks are arranged in said sequence in the plurality of tracks on the recording medium.

6. The apparatus of claim 5, wherein the video screen has horizontal and vertical dimensions and said sub-areas at said non-corresponding positions in different sections are separated in position along the horizontal dimension.

7. The apparatus of claim 5, wherein the video screen has horizontal and vertical dimensions and said sub-areas at said non-corresponding positions in different sections are separated in position along the vertical dimension.

8. The apparatus of claim 5, wherein the arranging means is operative to arrange the super macro blocks such that respectively different vertical positions of said respectively different sub-areas of the video screen are selected to maximize a vertical distance therebetween.

9. A method of recording digital video signals representing a video screen in a plurality of tracks on a recording medium, comprising the steps of:

dividing the digital video signals into a plurality of blocks representing corresponding pixel arrays of said video screen;

collecting the plurality of blocks of the divided digital video signals into respective macro blocks including digital video signals of a plurality of adjacent blocks;

assembling the macro blocks into sub-area groups representing respective sub-areas of the video screen, the sub-areas being defined as divided portions of said video screen obtained by dividing said video screen by a first integer number along a horizontal direction thereof to form an integer number of horizontal divisions and dividing the video screen by a second integer number along a vertical direction thereof to form a plurality of vertical divisions, the second integer number being equal to the number of said plurality of tracks;

shuffling the sub-area groups by forming a sequence of track units each comprising a plurality of said sub-area groups including one sub-area group from each of said horizontal divisions of said video screen selected from a respectively different vertical division thereof; and recording said sequence of track units on said recording medium such that each track unit is recorded in a respective one of said plurality of tracks.

10. The method of claim 9, wherein the step of shuffling said sub-area group comprises forming each of said sequence of track units as a series of buffering units each including a plurality of macro blocks each selected from a corresponding position of a respective one of the plurality of sub-area groups of the corresponding sequence of track units.

11. The method of claim 10, wherein the step of assembling the macro blocks into sub-area groups representing respective sub-areas of the video screen comprises selecting the sub-area groups such that each of the sub-area groups of a corresponding sequence of track units is selected from a respectively different horizontal division of said video screen.

12. The method of claim 11, wherein each of the sub-area groups of a corresponding sequence of track units is selected from a respectively different vertical position of said video screen.

13. The method of claim 12, wherein the respectively different vertical positions of each of the sub-area groups of a corresponding sequence of track units are selected to maximize the vertical distance therebetween.

14. An apparatus for recording digital video signals representing a video screen in a plurality of tracks on a recording medium, comprising:

means for dividing the digital video signals into a plurality of blocks representing corresponding pixel arrays of said video screen;

means for collecting the plurality of blocks of the divided digital video signals into respective macro blocks including digital video signals of a plurality of adjacent blocks;

assembling means for assembling the macro blocks into sub-area groups representing respective sub-areas of the video screen, the sub-areas being defined as divided portions of said video screen obtained by dividing said video screen by a first integer number along a horizontal direction thereof to form an integer number of horizontal divisions and dividing the video screen by a second integer number along a vertical direction thereof to form a plurality of vertical divisions, the second integer number being equal to the number of said plurality of tracks;

shuffling means for shuffling the sub-area groups by forming a sequence of track units each comprising a plurality of said sub-area groups including one sub-area group from each of said horizontal divisions of said video screen selected from a respectively different vertical division thereof; and means for recording said sequence of track units on said recording medium such that each track unit is recorded in a respective one of said plurality of tracks.

15. The apparatus of claim 14, wherein the shuffling means is operative to shuffle said sub-area groups by forming each of said sequence of track units as a series of buffering units each including a plurality of macro blocks each selected from a corresponding position of a respective one of the plurality of sub-area groups of the corresponding sequence of track units.

16. The apparatus of claim 15, wherein the assembling means is operative to assemble the macro blocks into sub-area groups representing respective sub-areas of the video screen selected such that each of the sub-area groups of a corresponding sequence of track units is selected from a respectively different horizontal division of said video screen.

17. The apparatus of claim 16, wherein each of the sub-area groups of a corresponding sequence of track units is selected from a respectively different vertical position of said video screen.

18. The apparatus of claim 17, wherein the respectively different vertical positions of each of the sub-area groups of a corresponding sequence of track units are selected to maximize the vertical distance therebetween.

* * * * *